(12) United States Patent
Robinson et al.

(10) Patent No.: US 9,808,673 B2
(45) Date of Patent: Nov. 7, 2017

(54) SYSTEM FOR AUTOMATICALLY PROVIDING HIGH-INTENSITY INTERVAL TRAINING (HIIT)

(71) Applicants: Julie C. Robinson, Grosse Pointe, MI (US); David R. Syrowik, Milford, MI (US)

(72) Inventors: Julie C. Robinson, Grosse Pointe, MI (US); David R. Syrowik, Milford, MI (US)

(*) Notice: Subject to any disclaimer, the term of this patent is extended or adjusted under 35 U.S.C. 154(b) by 26 days.

(21) Appl. No.: 14/993,270

(22) Filed: Jan. 12, 2016

(65) Prior Publication Data
US 2017/0197113 A1    Jul. 13, 2017

(51) Int. Cl.
| | |
|---|---|
| *A63B 24/00* | (2006.01) |
| *A63B 22/00* | (2006.01) |
| *A63B 22/02* | (2006.01) |
| *A63B 22/04* | (2006.01) |
| *A63B 22/20* | (2006.01) |
| *A63B 22/06* | (2006.01) |

(52) U.S. Cl.
CPC ...... *A63B 24/0087* (2013.01); *A63B 22/0076* (2013.01); *A63B 22/02* (2013.01); *A63B 22/04* (2013.01); *A63B 22/06* (2013.01); *A63B 22/203* (2013.01); *A63B 24/0075* (2013.01)

(58) Field of Classification Search
CPC . A63B 24/00; A63B 24/0062; A63B 24/0087; A63B 24/0075; A63B 22/0076; A63B 22/02; A63B 22/04; A63B 22/203; A63B 22/06

See application file for complete search history.

(56) References Cited

U.S. PATENT DOCUMENTS

| | | | |
|---|---|---|---|
| 5,890,995 A | 4/1999 | Bobick et al. | |
| 6,902,513 B1 | 6/2005 | McClure | |
| 8,029,415 B2 | 10/2011 | Ashby et al. | |
| 8,038,577 B2* | 10/2011 | McIntosh | A63B 21/00 482/1 |
| 8,306,635 B2 | 11/2012 | Pryor | |
| 8,585,555 B2 | 11/2013 | Tchao et al. | |
| 8,979,710 B2 | 3/2015 | McCready et al. | |

(Continued)

FOREIGN PATENT DOCUMENTS

| | | |
|---|---|---|
| WO | WO2009099315 A1 | 8/2009 |
| WO | WO2014084742 A1 | 6/2014 |

*Primary Examiner* — Glenn Richman
(74) *Attorney, Agent, or Firm* — Brooks Kushman P.C.

(57) ABSTRACT

A system for automatically providing high-intensity interval training (HIIT) is provided. The system may include exercise apparatus which a user manipulates to achieve exercise and which is controllable to provide an exercise profile having a high-intensity exercise interval to the user during user exercise. A stimulator subsystem is controllable to provide sets of stimuli to the user during user exercise including a set of stimuli capable of evoking a pupillary response in the user. An imaging assembly images a pupil of an eye of the user during user exercise to obtain a set of images of the pupil. An image processor processes the set of images to obtain measurements which measure the pupillary response. A system controller controls the exercise apparatus and the stimulator subsystem so that the exercise apparatus automatically provides the high-intensity exercise interval to the user based on the measurements.

24 Claims, 4 Drawing Sheets

(56) References Cited

U.S. PATENT DOCUMENTS

| | | | |
|---|---|---|---|
| 9,201,270 B2 | 12/2015 | Fattal et al. | |
| 2008/0110115 A1* | 5/2008 | French | A63B 71/04 52/311.1 |
| 2009/0253554 A1* | 10/2009 | McIntosh | A63B 21/00 482/4 |
| 2010/0075808 A1* | 3/2010 | Luberski | A63B 22/18 482/8 |
| 2011/0009241 A1* | 1/2011 | Lane | A63B 24/0087 482/8 |
| 2013/0083003 A1* | 4/2013 | Perez | G06F 3/005 345/419 |
| 2013/0321581 A1 | 12/2013 | El-Ghoroury et al. | |
| 2014/0146133 A1 | 5/2014 | Nikonov et al. | |
| 2015/0049114 A1* | 2/2015 | Geisner | A63F 13/216 345/633 |
| 2015/0238079 A1 | 8/2015 | Cleveland | |
| 2016/0206922 A1* | 7/2016 | Dalebout | A63B 24/0087 |
| 2017/0065851 A1* | 3/2017 | Deluca | A63B 24/0087 |
| 2017/0080320 A1* | 3/2017 | Smith | G06F 19/3481 |

* cited by examiner

SYSTEM FOR AUTOMATICALLY PROVIDING HIGH-INTENSITY INTERVAL TRAINING (HIIT)

TECHNICAL FIELD

This invention generally relates to an exercise apparatus or fitness equipment and, more specifically to systems which automatically provide high-intensity interval training (HIIT) to a user of such apparatus or equipment.

Overview

As described in U.S. Pat. No. 8,029,415, in an attempt to improve their health and physical conditioning, consumers are purchasing exercise devices in record quantities. One common challenge with exercise equipment is motivating the purchaser to use the device on a consistent and ongoing basis. This lack of motivation can be a result of the repetitive nature of the exercises and exercise routines that a user can perform on a specific exercise device as well as the versatility of the exercise devices.

A large segment of society finds it easier and more convenient to go to health clubs to use exercise equipment to exercise. Health clubs have extended hours and a wide range of fitness equipment that allows workout schedules to be flexible and workouts to be quick. Current exercise equipment unfortunately makes working out a chore that is tolerated due to the importance of cardiovascular (aerobic) fitness.

To exercise anaerobically means to train without oxygen. Anaerobic exercise is defined as short duration, high-intensity exercise lasting anywhere from merely seconds up to around two minutes. After two minutes, the body's aerobic system kicks in. An example would be sprinting. When one trains in this level of intensity for short bursts of energy, one creates what is called EPOC, or excess post-exercise oxygen consumption. In essence, EPOC is an after-burn effect of calories burning at rest for up to 38 hours post exercise.

Studies correlate anaerobic training to loss of belly fat and increased growth hormone. High-intensity intermittent exercise (HIIE) or high-intensity interval training (HIIT) is a form of interval training widely viewed to be an effective means for reducing body fat. HIIT provides more potent metabolic stimuli than low-to-moderate intensity exercise leading to increased lactate and catecholamine levels. These catecholamines, mainly epinephrine and norepinephrine, have been shown to drive lipolysis and promote fat to be released from visceral fat stores. Increased plasma catecholamine levels result in an increase in heart rate infusing one's brain and muscles with needed fuel, as well as pupil dilation.

In fact, since adrenaline and noradrenaline are the main hormones whose concentrations increase markedly during exercise, many researchers have worked on the effect of exercise on these amines and reported 1.5 to >20 times basal concentrations depending on exercise characteristics, with anaerobic exercise evoking the highest concentrations. Changes in specific metabolic pathways associated with glycolysis, aerobic metabolism β-oxidation, and mitochondrial biogenesis are greater after high-intensity exercise than after traditional low-to-moderate intensity aerobic conditioning. Waist and hip circumferences decrease significantly. Individual's physical ability and mental strength to exercise at high intensities may thus be also a key element for success in a weight loss program. Chronic exposure to high-intensity exercise results in significant increases in aerobic and anaerobic fitness, increased skeletal muscle capacity for fatty acid oxidation and glycolytic enzyme content, and increased insulin sensitivity.

With a typical stationary exercise cycle, a user sits on a seat, holds onto one or more handles, and pedals with his or her feet. In order to provide variety during the exercise routine, the user can increase or decrease his or her pedaling rate at various times during the exercise routine. This can be done by increasing or decreasing the amount of effort the user uses to pedal or by increasing or decreasing the pedaling resistance provided by the exercise cycle. Additionally, many stationary exercise cycles are pre-programmed with one or more exercise routines that automatically adjust the pedaling resistance at various time intervals during the exercise routine. Adjusting the pedaling rate and/or the pedaling resistance can allow a user to achieve a workout suitable for the user's fitness level and goals. Adjusting the pedaling rate and/or the pedaling resistance, however, is often insufficient to maintain a user's motivation to consistently use the stationary exercise cycle.

Typical treadmills also allow a user to adjust various operating parameters to provide for improved workouts and variety during the workouts. As with the stationary exercise cycles, however, users are typically limited as to which treadmill operating parameters can be adjusted. For instance, treadmills usually provide for the adjustment of the speed and incline of the endless belt upon which the user ambulates. This allows a user to walk, jog, and/or run on the treadmill. It also allows the user to ambulate on a level surface or on an inclined surface that generally replicates a hill. These adjustable operating parameters are, like those of the stationary exercise cycles, often insufficient to motivate a user to consistently use the treadmill on an ongoing basis.

Another factor that contributes to the lack of motivation to use exercise devices is the lack of visual or other type of stimulation provided to the user while using the exercise device. In other words, users of exercise devices often become bored because their surroundings do not change during an exercise routine. Rather, their surroundings (i.e., the room in which the exercise device is located) are generally the same each time the user exercises and throughout each exercise session. This boredom can discourage the user from regularly using the exercise device. Even when the user does use the exercise device, the boredom resulting from the lack of stimulation can cause the user to not work as hard during the exercise session, which can hamper the user's ability to achieve his or her fitness goals.

In order to combat this lack of stimulation, many exercise devices are equipped with a display for providing visual stimulation and motivation to the user of the device. For example, some displays depict a tract for indicating to a user how far the user has run or pedaled. Similarly, some displays depict hills that provide a visual representation of the resistance or inclination of the device. For instance, the display of a stationary exercise cycle may depict a series of hills that are related to the pedaling resistance of the exercise cycle. As the user "rides up the hill," the pedaling resistance will increase; the steeper the hill, the greater the pedaling resistance will be. Correspondingly, as the user "rides down the hill," the pedaling resistance will decrease. While these types of displays may provide some visual stimulation to the user, most users will quickly become bored with such displays, and the desired stimulatory benefits will not be realized. In contrast, when a person goes outside for a walk, run, or bicycle ride, the person's surroundings are constantly changing, which can provide sufficient stimulation to the person's mind to keep them motivated throughout the exercise routine.

For purposes of this application, the terms "fitness equipment" and "exercise apparatus" include, but are not limited to, treadmills, exercise bicycles (both upright and recumbent), rowing machines, skiing machines, stair or stepping machines, cross-trainers, climbing machines, etc. Most of these devices are stationary equipment that are utilized to achieve cardiovascular or aerobic exercise.

It is known that pupil size can change in response to audio and/or visual stimuli which, in turn, changes one's emotional state. For example, the pupil (having a diameter, A, as shown in FIG. 1) dilates significantly (i.e. many millimeters) in response to stimuli which trigger a "fight or flight" response. Such eye dilation can be measured using a pupil response system including at least one pupilometer.

The following U.S. patent documents are also related to at least one aspect of the present invention: U.S. Pat. Nos. 8,979,710; 8,585,555; 8,306,635; 6,902,513; and 5,890,995. Also related are patent documents WO2014/084742 and WO2009/099315.

SUMMARY

One object of at least one embodiment of the present invention is to provide a system which automatically provides high-intensity interval training (HIIT) to a user of exercise apparatus by using sets of stimuli to evoke a sympathetic outflow response, effectively increasing an individual's catecholamine level while ramping up the intensity of exercise for short bursts to provide the user with an effective, high-intensity, exercise experience.

Another object of at least one embodiment of the present invention is to provide a system which automatically provides high-intensity interval training (HIIT) to a user of exercise apparatus by imaging a pupil of an eye of the user during user exercise using an eye-tracking subsystem and measuring pupil dilation.

In carrying out at least one of the above objects and other objects of the prevent invention, a system for automatically providing high-intensity interval training (HIIT) is provided. The system may include exercise apparatus which a user manipulates to achieve exercise and which is controllable to provide an exercise profile having a high-intensity exercise interval to the user during user exercise. A stimulator subsystem is controllable to provide sets of stimuli to the user during user exercise including a set of stimuli capable of evoking a pupillary response in the user. An imaging assembly images a pupil of an eye of the user during user exercise to obtain a set of images of the pupil. An image processor processes the set of images to obtain measurements which measure the pupillary response. A system controller controls the exercise apparatus and the stimulator subsystem so that the exercise apparatus automatically provides the high-intensity exercise interval to the user based on the measurements.

The exercise apparatus may include one of an exercise cycle, a treadmill, a stair climber, an elliptical machine, a skiing simulator and a rowing machine.

The stimulator subsystem may include a display device wherein the sets of stimuli includes visual stimuli. The display may be a light-field or holographic display.

The pupillary response may include a change in pupil size.

The imaging assembly may include a source of infrared light to illuminate the pupil of the eye.

At least part of the imaging assembly may be head-mounted.

The system may further include an oximeter for measuring heart rate of the user during user exercise wherein the system controller controls the exercise apparatus based on measured heart rate.

The stimulator subsystem may include at least one speaker or transducer wherein the sets of stimuli includes audio stimuli.

At least one of the stimulator subsystem and the imaging assembly may be head-mounted.

The sets of stimuli may include audio and video stimuli.

The imaging assembly may include an eye-tracking subsystem which compensates for head and eye movement of the user during user exercise.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
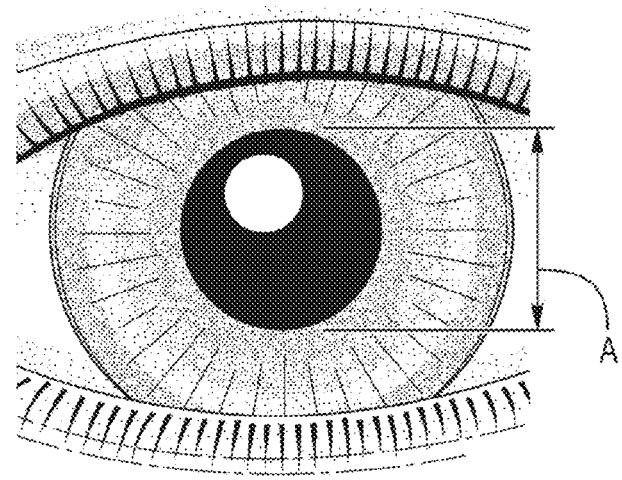
FIG. 1 is a view, partially broken away, of a human eye wherein the reference letter "A" represents pupil diameter.
Figure 2:
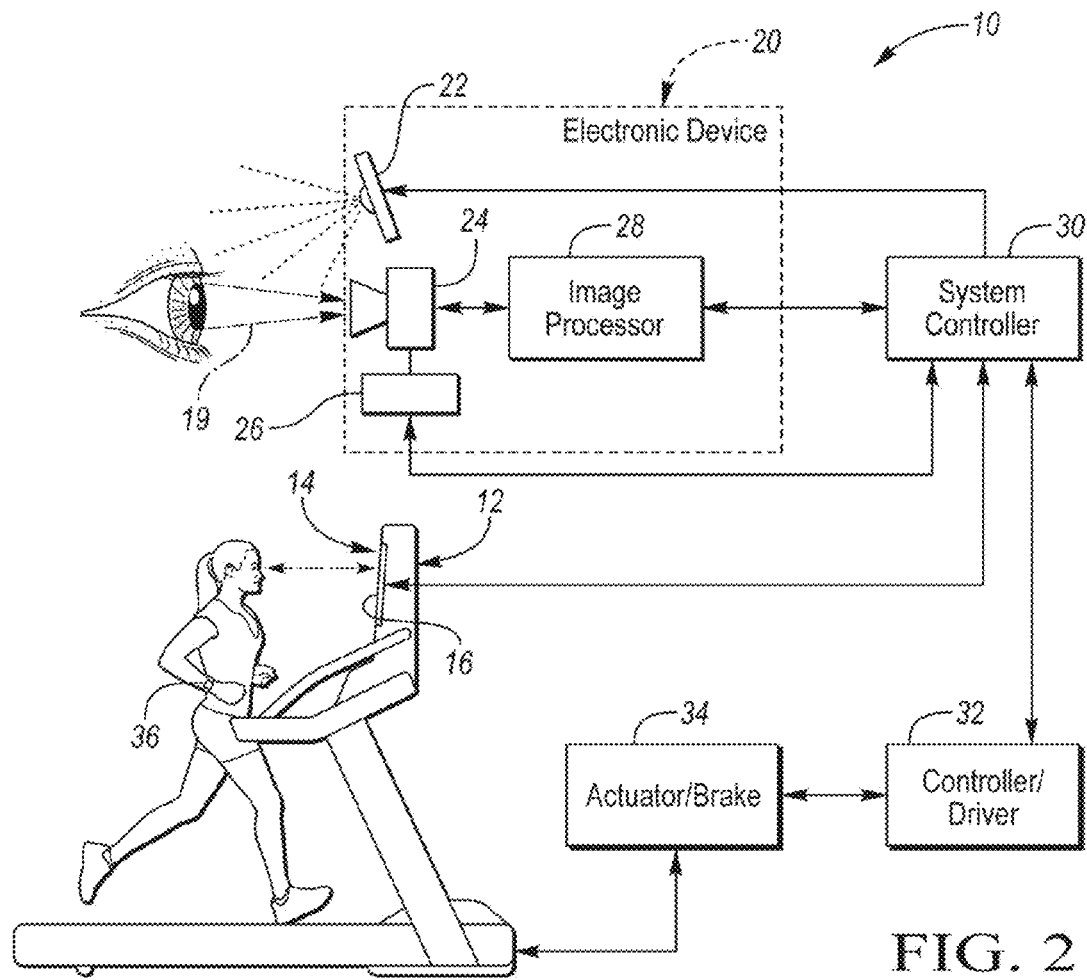
FIG. 2 is a block diagram schematic view of a system constructed in accordance with at least one embodiment of the present invention during user exercise on exercise apparatus.

Referring now to FIG. 2, there is illustrated one embodiment of a system, generally indicated at 10, for automatically providing high-intensity interval training. The system may include exercise apparatus, generally indicated at 12, in the form of a treadmill which a user manipulates by running or walking to achieve exercise and which is controllable by a system controller 30 to provide an exercise profile having a high-intensity exercise interval to the user during user exercise. The exercise apparatus may include one of an exercise cycle, a treadmill (as shown in FIGS. 2-9), a stair climber, an elliptical machine, a skiing simulator and a rowing machine. Other exercise apparatus may also be used in the system 10.

Figure 3:
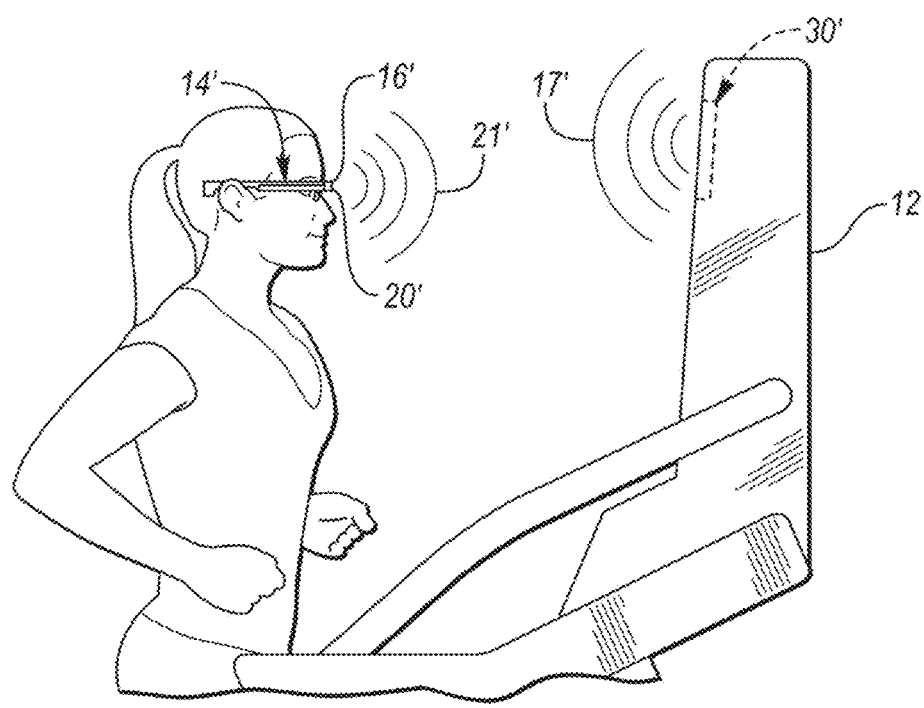
FIG. 3 is an enlarged schematic view, partially broken away, of another embodiment of the system wherein a stimulator subsystem and an imaging assembly are head-mounted during user exercise.
Figure 4:
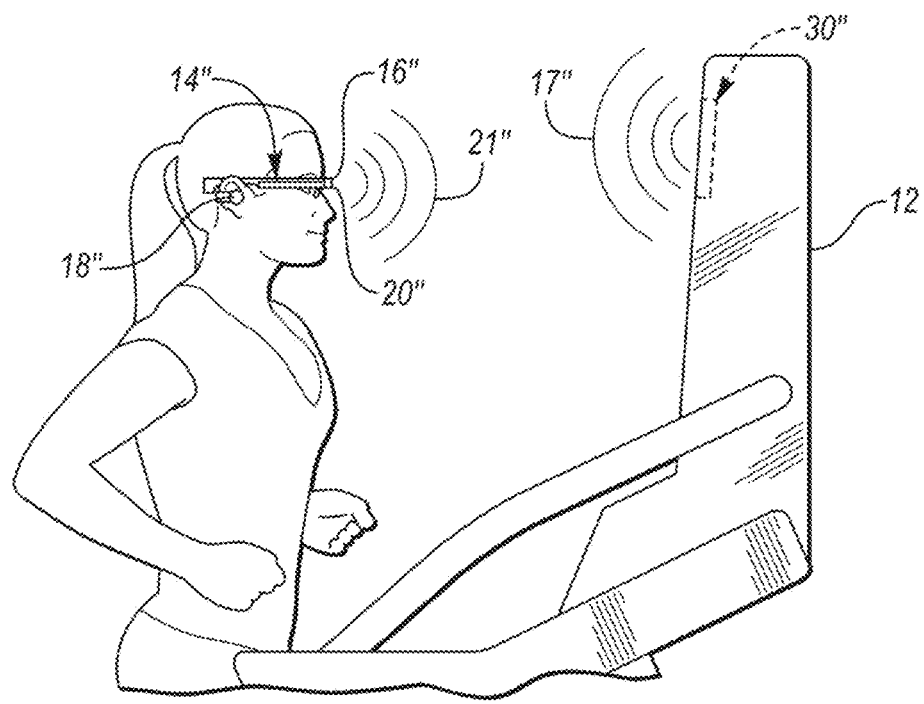
FIG. 4 is a view, similar to the view of FIG. 3, wherein audio, as well as video stimuli, are provided to the user during user exercise.
Figure 5:
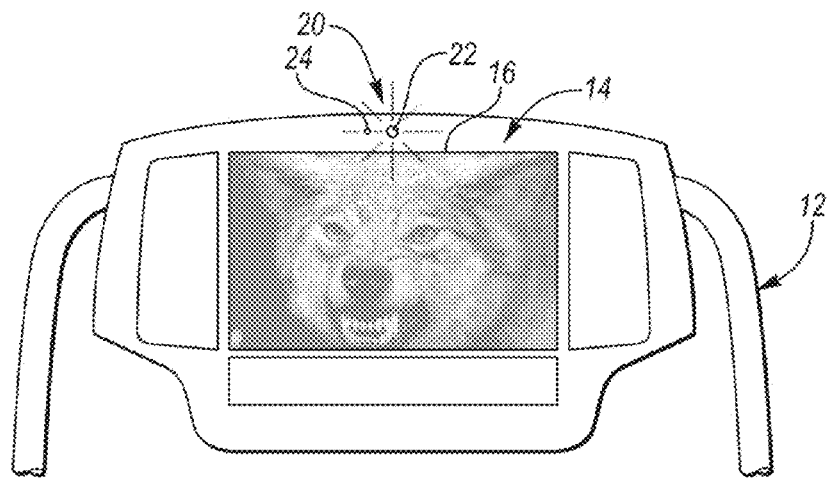
FIG. 5 is a schematic view, partially broken away, of one type of visual stimuli in the form of an image provided by a display supported on the exercise apparatus and designed to evoke a "flight or fight" response in the user during user exercise.
Figure 6:
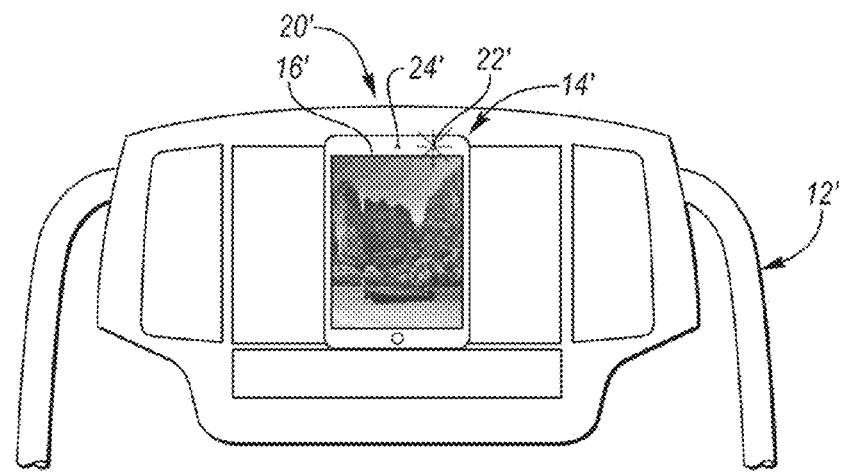
FIG. 6 is a schematic view, similar to the view of FIG. 5, except the visual stimuli in the form of an image is provided by a supported tablet computer under system control and is designed to evoke a serene or calm emotional response.
Figure 7:
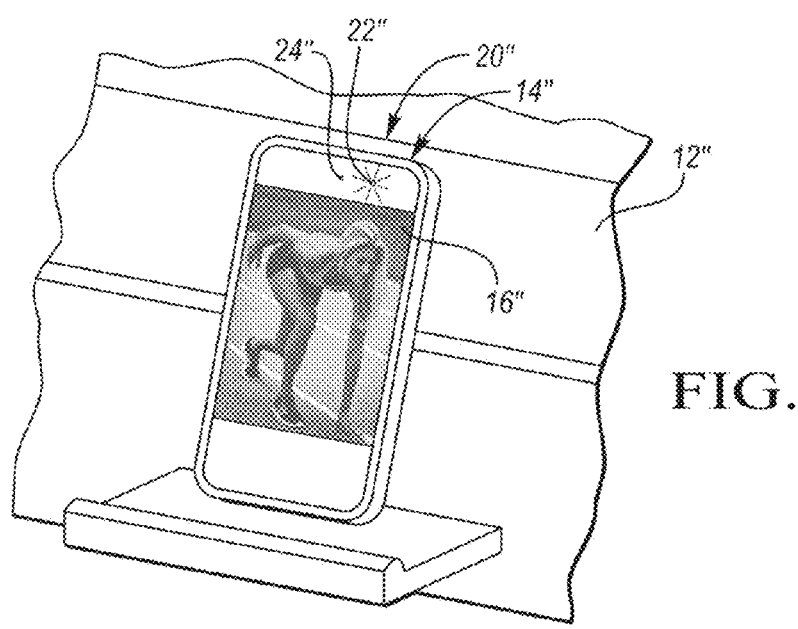
FIG. 7 is a schematic view, similar to the views of FIGS. 5 and 6, except visual stimuli in the form of a motivational image and/or video is provided by a smartphone under system control.

The system 10 includes a stimulator subsystem, generally indicated at 14, controllable by the system controller 30 to provide sets of stimuli to the user during user exercise including a set of stimuli capable of evoking a pupillary response in the user such as increased pupil diameter (i.e. dilation). The stimulator subsystem 14 preferably includes a visual display device or screen 16 (FIGS. 2 and 5) wherein the sets of stimuli include visual stimuli displayed on the display device 16. The display device 16 may be an integral part of the exercise equipment (as shown in FIGS. 2, 5, 8 and 9), may be head-mounted (as shown in FIGS. 3 and 4) or may be part of a hand-held electronic device supported on the exercise equipment (as shown in FIGS. 6 and 7). The pupillary response preferably includes a change in pupil size.

As previously mentioned, display devices of stimulator subsystems 14' and 14" may be head-mounted as shown in FIGS. 3 and 4 at 16' and 16", respectively. The display device (16' or 16") may receive short-range, wireless RF video and/or audio signals 17' or 17" from a transmitter of the system controller 30' or 30". The subsystem 14 may include an optical head-mounted display device such as Google® Glass which is worn like a pair of eyeglasses. The device typically includes a wearable computer, a touch pad, a camera, and a display. The device may be voice activated. A voice response to a verbal command may be provided by a bone conduction transducer 18" which fits behind or in the user's ear as shown in FIG. 4. The device may have Wi-Fi and Bluetooth® connectivity with the system controller.

Figure 8:
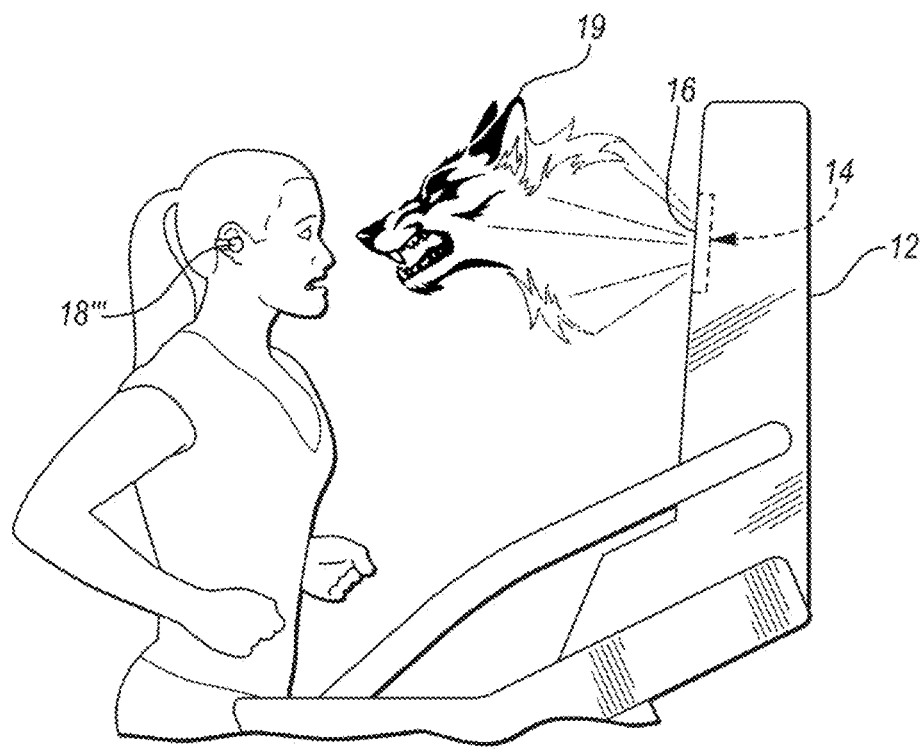
FIG. 8 is a schematic view, partially broken away, of one type of visual stimuli in the form of a light-field or holographic image provided by a display designed to evoke a "flight or fight" response in the user during user exercise.
Figure 9:
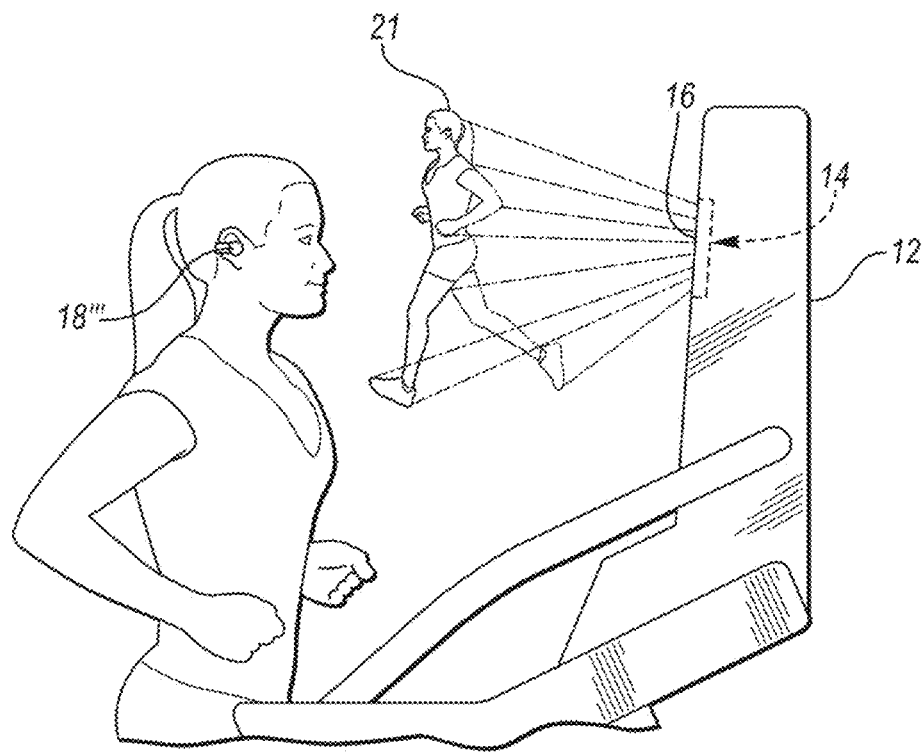
FIG. 9 is a schematic view, similar to the view of FIG. 8, except the visual stimuli in the form of a light-field or holographic image provided by a display and designed to motivate the user.

The system 10 and, in particular, the stimulator subsystem 14 may have the ability to generate and display the images in a realistic three-dimensional image, (i.e., as a light-field or a holographic image) as shown at 19 and 21 in the drawing FIGS. 8 and 9, respectively. Therefore, as the user moves his/her head around, the holographic image appears to change just as the image of a real object changes. Such subsystems (which may include an eye-tracking subsystem) are disclosed in published U.S. patent application 2014/0146133. Such subsystems are also disclosed in U.S. Pat. No. 9,201,270 and published U.S. patent application No. 2013/0321581 assigned to Leia Inc. of Menlo Park, Calif. and Ostendo Technologies, Inc. of Carlsbad, Calif.

The sets of stimuli may include audio and video stimuli obtained from wireless signals 17" as shown in FIG. 4 wherein the stimulator subsystem 14" may also include at least one speaker in the form of a transducer, headphone or earbuds 18" wherein the sets of stimuli includes audio stimuli such as music.

The system 10 also includes an imaging assembly, generally indicated at 20, to image a pupil of an eye of the user during user exercise to obtain a set of images of the pupil. The imaging assembly 20 is typically an electronic device which may be built into the exercise machine 12 (as shown in FIG. 5) or may be part of a hand-held electronic device such as a tablet computer 14' (FIG. 6) or a smartphone 14" (FIG. 7). The imaging assembly 20, 20' or 20" may also include a source of infrared light 22 to illuminate the pupil of the eye (without causing eye dilation) as shown in FIG. 2 (at 22' in FIGS. 6 and 22" in FIG. 7). Reflected infrared light waves or signals are shown at 19 in FIG. 2. At least part of the imaging assembly 20 may be head-mounted as shown in FIGS. 3 and 4 at 20' and 20", respectively. The imaging system 20 may also include a camera 24, (in FIGS. 2 and 5 and at 24' and 24" in FIGS. 6 and 7, respectively). The assembly 20' or 20" may be controlled by commands contained within the signals 17' or 17", respectively.

The imaging assembly 20 may also include a miniaturized eye-tracking subsystem which compensates for head and eye movement of the user during user exercise. Such subsystems are disclosed in published patent application 2015/0238079 assigned to LC Technologies, Inc. of Fairfax, Va. Such subsystems typically utilize a camera, such as the camera 24, a MEMS device 26 and a processor, such as the processor 28, that receives and processes images of the eye from the camera 24 wherein the MEMS device 26 is controlled by the system controller 30 based on the processed images.

The image processor 28 also processes the set of images to obtain measurements which measure the pupillary response such as pupil diameter. In turn, the measurements are communicated to the system controller 30 which, in turn, provides wired or wireless control signals to the other components of the system 10 via control logic. The measurements may be contained in measurement signals, such as short range RF signals 21' and 21" wirelessly transmitted by the assemblies 20' and 20" and received by the system controllers 30' and 30", respectively, as shown in FIGS. 3 and 4.

The system controller 30 controls the exercise apparatus 12, the stimulator subsystem 14 and the imaging assembly 20, including the MEMS device 26 so that the exercise apparatus 12 automatically provides a high-intensity exercise interval to the user based on the measurements. The controller 30 may control the exercise apparatus 12 through a controller/driver 32 which, in turn, drives or controls an actuator or brake 34 of the exercise apparatus 12. During eye dilation, (as measured by the image processor 28) the user experiences a sympathetic outflow response thereby enabling the user to exercise at a relatively high intensity.

The system 10 may also include an oximeter 36 (FIG. 2) for measuring heart rate of the user during user exercise. The oximeter 36 may be incorporated within a smart watch worn by the user. The system controller 30 may be in wireless communication with the oximeter 36 (such as via Bluetooth®) to further control the exercise apparatus 12 based on the measured heart rate.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A system for automatically providing high-intensity interval training, the system comprising:
   exercise apparatus which a user manipulates to achieve exercise and which is controllable to provide an exercise profile having a high intensity exercise interval to the user during user exercise;
   a stimulator subsystem controllable to generate sets of stimuli to the user during user exercise including a set of stimuli capable of evoking a pupillary response in the user;
   an imaging assembly to image a pupil of an eye of the user during user exercise to obtain a set of images of the pupil;
   an image processor to process the set of images to obtain measurements which measure the pupillary response; and
   a system controller for controlling the exercise apparatus and the stimulator subsystem so that the exercise apparatus automatically provides the high-intensity exercise interval to the user based on the measurements.

2. The system as claimed in claim 1, wherein the exercise apparatus includes one of an exercise cycle, a treadmill, a stair climber, an elliptical machine, a skiing simulator and a rowing machine.

3. The system as claimed in claim 1, wherein the stimulator subsystem includes a display device and wherein the sets of stimuli includes visual stimuli.

4. The system as claimed in claim 1, wherein the pupillary response includes a change in pupil size.

5. The system as claimed in claim 1, wherein the imaging assembly includes a source of infrared light to illuminate the pupil of the eye.

6. The system as claimed in claim 1, wherein at least part of the stimulator subsystem is head-mounted.

7. The system as claimed in claim 1, further comprising an oximeter for measuring heart rate of the user during user exercise wherein the system controller controls the exercise apparatus based on measured heart rate.

8. The system as claimed in claim 1, wherein the stimulator subsystem includes at least one speaker or transducer and wherein the sets of stimuli includes audio stimuli.

9. The system as claimed in claim 1, wherein at least one of the imaging assembly and stimulator subsystem is head-mounted.

10. The system as claimed in claim 1, wherein the sets of stimuli include audio and video stimuli.

11. The system as claimed in claim 1, wherein the imaging assembly includes an eye-tracking subsystem which compensates for head and eye movement of the user during user exercise.

12. The system as claimed in claim 3, wherein the display is a light-field or holographic display.

13. A system for use with exercise apparatus which a user manipulates to achieve exercise and which is controllable to provide an exercise profile having a high intensity exercise interval to the user during user exercise, the system controlling the apparatus to automatically provide high-intensity interval training, the system comprising:
   a stimulator subsystem controllable to generate sets of stimuli to the user during user exercise including a set of stimuli capable of evoking a pupillary response in the user;
   an imaging assembly to image a pupil of an eye of the user during user exercise to obtain a set of images of the pupil;
   an image processor to process the set of images to obtain measurements which measure the pupillary response; and
   a system controller for controlling the exercise apparatus and the stimulator subsystem so that the exercise apparatus automatically provides the high-intensity exercise interval to the user based on the measurements.

14. The system as claimed in claim 13, wherein the exercise apparatus includes one of an exercise cycle, a treadmill, a stair climber, an elliptical machine, a skiing simulator and a rowing machine.

15. The system as claimed in claim 13, wherein the stimulator subsystem includes a display device and wherein the sets of stimuli includes visual stimuli.

16. The system as claimed in claim 13, wherein the pupillary response includes a change in pupil size.

17. The system as claimed in claim 13, wherein the imaging assembly includes a source of infrared light to illuminate the pupil of the eye.

18. The system as claimed in claim 13, wherein at least part of the stimulator subsystem is head-mounted.

19. The system as claimed in claim 13, further comprising an oximeter for measuring heart rate of the user during user exercise wherein the system controller controls the exercise apparatus based on measured heart rate.

20. The system as claimed in claim 13, wherein the stimulator subsystem includes at least one speaker or transducer and wherein the sets of stimuli includes audio stimuli.

21. The system as claimed in claim 13, wherein at least one of the imaging assembly and the stimulator subsystem is head-mounted.

22. The system as claimed in claim 13, wherein the sets of stimuli include audio and video stimuli.

23. The system as claimed in claim 13, wherein the imaging assembly includes an eye-tracking subsystem which compensates for head and eye movement of the user during user exercise.

24. The system as claimed in claim 15, wherein the display is a light-field or holographic display.

* * * * *